(12) United States Patent
Williams

(10) Patent No.: US 8,668,125 B2
(45) Date of Patent: Mar. 11, 2014

(54) VEHICLE RACK SYSTEM

(75) Inventor: David A. Williams, Milton, FL (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 194 days.

(21) Appl. No.: 13/192,619

(22) Filed: Jul. 28, 2011

(65) Prior Publication Data
US 2013/0026202 A1    Jan. 31, 2013

(51) Int. Cl.
*B60R 9/06* (2006.01)

(52) U.S. Cl.
USPC .......................... 224/405; 224/402; 224/403

(58) Field of Classification Search
USPC .............. 224/402–405, 545, 555, 557; 296/3; 410/101, 102, 104, 106, 110; 411/955, 411/957, 965, 966, 967, 976, 977, 988, 992, 411/996, 21, 36, 34, 35, 44, 45, 46, 47, 48, 411/55; 248/229.1, 229.13, 229.14, 499, 248/500, 503; 403/157, 364, 408.1
See application file for complete search history.

(56) References Cited

U.S. PATENT DOCUMENTS

| | | |
|---|---|---|
| 2,947,566 A | 8/1960 | Tower |
| 3,430,582 A | 3/1969 | Appelt et al. |
| 3,589,576 A | 6/1971 | Rinkle |
| 3,724,730 A * | 4/1973 | Olsen et al. ............. 224/309 |
| 4,138,046 A | 2/1979 | De Freze |
| 4,152,020 A | 5/1979 | Brown et al. |
| 4,211,448 A | 7/1980 | Weston |
| 4,215,894 A | 8/1980 | Sidlinger |
| 4,423,899 A | 1/1984 | Langmead |
| 4,509,787 A | 4/1985 | Knaack et al. |
| 4,565,402 A | 1/1986 | Hopkins |
| 4,813,734 A | 3/1989 | Hoover |
| 5,002,324 A | 3/1991 | Griffin |
| 5,108,141 A | 4/1992 | Anderson |
| 5,137,320 A | 8/1992 | Christensen |
| 5,143,415 A | 9/1992 | Boudah |
| 5,192,107 A | 3/1993 | Smith, Sr. |
| 5,228,739 A | 7/1993 | Love |
| 5,353,826 A | 10/1994 | Davis, Sr. |
| 5,470,120 A | 11/1995 | Christensen |
| 5,494,327 A | 2/1996 | Derecktor |
| 5,628,540 A | 5/1997 | James |
| 5,725,137 A | 3/1998 | Macdonald |
| 5,765,902 A | 6/1998 | Love |
| 5,836,635 A | 11/1998 | Dorman |
| 5,848,743 A | 12/1998 | Derecktor |
| D410,429 S | 6/1999 | Derecktor |
| 5,927,782 A | 7/1999 | Olms |

(Continued)

OTHER PUBLICATIONS

Assembly and Installation Instructions; Weather Guard, Division of Knaack Mfg. Co.; Jul. 2004 Model 1225 Service Body Ladder Rack.

(Continued)

*Primary Examiner* — Adam Waggenspack
(74) *Attorney, Agent, or Firm* — GrayRobinson PA

(57) ABSTRACT

A rack system for vehicles such as pickup trucks comprises a number of base supports each clamped atop one of the opposed vehicle side walls by effective but economical clamping devices, a side rail mounted to each base support in an aesthetically pleasing fashion, and, tie-down devices releasably secured to cross bars extending between side rails located on opposite side walls of the vehicle.

9 Claims, 5 Drawing Sheets

(56) References Cited

U.S. PATENT DOCUMENTS

| | | |
|---|---|---|
| 5,951,092 A | 9/1999 | Cissell |
| 6,059,159 A | 5/2000 | Fisher |
| 6,347,731 B1 | 2/2002 | Burger |
| 6,431,634 B1 | 8/2002 | Ananian |
| 6,513,849 B2 | 2/2003 | Carter |
| 6,547,311 B1 | 4/2003 | Derecktor |
| 6,637,793 B2 | 10/2003 | Krause |
| 6,681,971 B2 * | 1/2004 | Laverack et al. ............. 224/319 |
| 6,786,522 B2 | 9/2004 | Kench, III et al. |
| 6,793,186 B2 * | 9/2004 | Pedersen .................. 248/229.13 |
| 6,971,563 B2 * | 12/2005 | Levi ............................... 224/405 |
| 7,014,236 B2 | 3/2006 | Kerns |
| 7,191,923 B1 * | 3/2007 | Kundig ......................... 224/257 |
| 7,296,837 B2 * | 11/2007 | Niedziela et al. .................. 296/3 |
| 7,322,499 B2 * | 1/2008 | Storer ........................... 224/405 |
| 7,419,075 B2 | 9/2008 | Green |
| D582,337 S | 12/2008 | Derecktor |
| 7,464,977 B1 | 12/2008 | Price |
| 7,497,493 B1 | 3/2009 | Thiessen et al. |
| 7,530,614 B2 | 5/2009 | Nichols |
| 7,641,251 B1 | 1/2010 | Stepanians |
| 7,753,615 B1 | 7/2010 | Sprague |
| 7,758,091 B1 | 7/2010 | McCall |
| 2002/0125728 A1 | 9/2002 | Chambers |
| 2005/0279192 A1 * | 12/2005 | Richter .......................... 81/58.3 |
| 2006/0263163 A1 * | 11/2006 | Harberts et al. ............. 410/104 |
| 2008/0100075 A1 | 5/2008 | Derecktor |
| 2009/0026784 A1 | 1/2009 | Green |
| 2009/0162138 A1 | 6/2009 | Burger et al. |
| 2010/0072237 A1 | 3/2010 | Green |
| 2010/0288808 A1 * | 11/2010 | Marr, Jr. ....................... 224/403 |

OTHER PUBLICATIONS

Assembly and Installation Instructions; Weather Guard, Division of Knaack Mfg. Co.; Jul. 2004 Model 1425 Aluminum Swivel Rack.

Installation Manual; Weather Guard, Division of Knaack Mfg. Co.; Nov. 2003 Model 1200 Full Size Truck Model 1205 Compact Size Truck.

Stake Pocket Truck Ladder Racks; Dec. 13, 2010 http://www.pickupspecialties.com/usrack/stake_pocket_truck_ladder_racks.htm.

Contractor Aluminum Truck Rack; DCAAR422XT; Jun. 28, 2011 http://www.dewalt.com/tools/vehicle-racks--toolboxes-aluminum-truck-rack-dcaar422xt.as . . . .

DeWalt Aluminum Contractor Truck Rack; Dec. 13, 2010 http://www.cargogear.com/infolib.aspx?lookup=DWARACK&image=dwarackjpg.

* cited by examiner

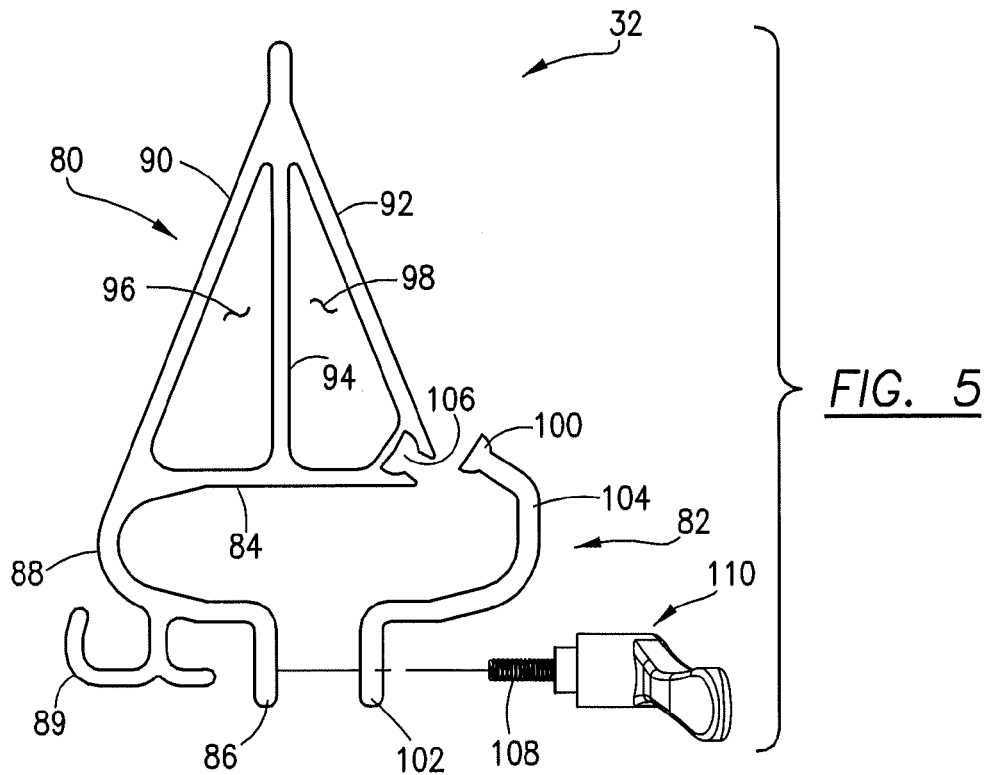
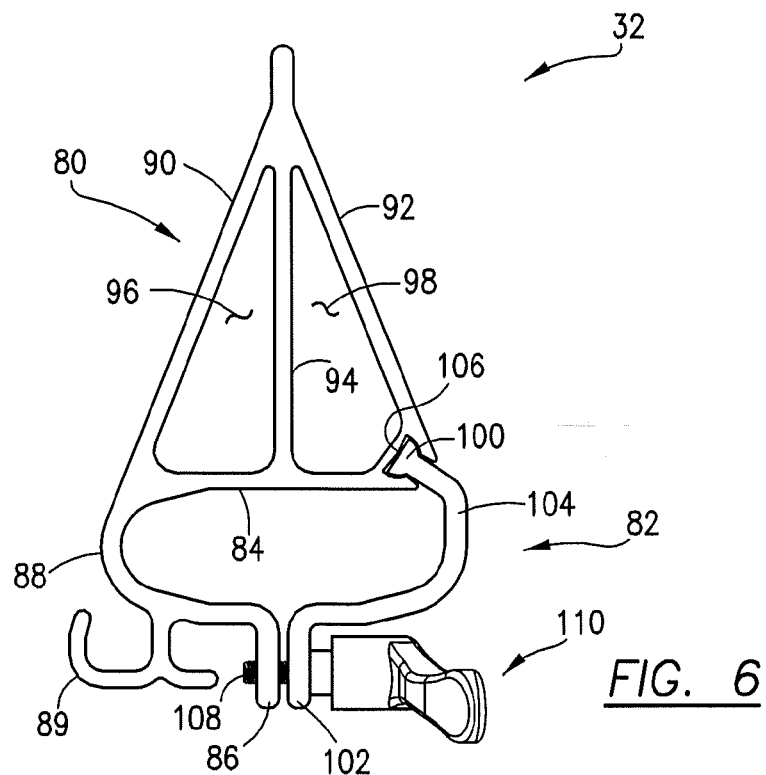

VEHICLE RACK SYSTEM

FIELD OF THE INVENTION

This invention relates to a rack system for vehicles, and, more particularly, to a rack system for pickup trucks and similar vehicles including improved structure for clamping to the side walls of the vehicle, novel tie-downs and an enhanced aesthetic appearance.

BACKGROUND OF THE INVENTION

Rack systems for mounting ladders and other equipment to the bed of pickup trucks and similar vehicles are well known in the prior art. Most systems of this type generally comprise a framework of four or more upright side rails, two of which are mounted atop or alongside one of the side walls of the truck with the other two located on the opposite sidewall. Cross bars are connected between aligning side rails on opposite side walls so that they span the bed of the truck in position to support equipment or materials in an elevated position above the truck bed.

Many owners of pickup trucks are reluctant to permanently mount a rack system or any other device to the vehicle, or to attach such items in a way that would leave mounting holes or the like in the side walls or bed of the truck in the event the rack system or other device is ever removed. This issue has been addressed in the prior art by rack systems which provide one or more base supports adapted to clamp onto the side walls of the truck. Typically, these base support(s) rest atop one of the side walls of the truck in position to support one or both of the upright side rails of the rack system noted above. The joint connection between the base support(s) and upright side rails is typically cumbersome, or, at best, of limited aesthetic appeal. Further, the clamping devices employed to secure the base support(s) to the side walls of the truck are in many cases overly complicated and expensive.

Tie-down devices are also commonly used in rack systems for vehicles in order to secure ladders of other items atop the cross bars described above. Most prior art tie-downs suffer from one or more limitations, e.g. it is difficult to adjust their position along the cross bars, or they are not easily mounted to and removed from the cross bars and/or they lack versatility in how rope, cords or other securing means may be mounted to the tie-down and to the items to be secured on the rack system.

SUMMARY OF THE INVENTION

This invention is directed to a rack system for vehicles such as pickup trucks comprising a number of base supports each clamped atop one of the opposed vehicle side walls by effective but economical clamping devices, a side rail mounted to each base support in an aesthetically pleasing fashion, and, tie-down devices releasably secured to cross bars extending between side rails located on opposite side walls of the vehicle.

In one aspect of this invention, clamping devices are provided having three legs that are spaced from one another. Two of the legs capture a base support between them, and a third leg receives a bolt in position to engage the vehicle side wall thus clamping the base support in place. The base supports may be easily removed from the vehicle by loosening the bolts, and no holes or the like are left in the side walls or bed of the vehicle.

A side rail is mounted to each base support via threaded fasteners extending from underneath such base supports into an internally threaded bore formed in a base plate located in the lower end of each side rail. In order to improve the aesthetics of the rack system, an adaptor is position over the point of connection between each side rail and base support. Each adaptor has an outer wall which encircles the bottom end of each side rail and rests atop the base support. Each adaptor is held in place by an internal plate through which the threaded fasteners extend so that when the side rails are tightened down on the base supports, the internal plate of each adaptor is captured between one of the side rails and base supports.

In another aspect of this invention, a number of tie-down devices are provided which may be easily and rapidly mounted in any location along the length of the cross bars of the rack system. Each tie-down device has a number of convenient locations to which a rope, cord or other securing means may be attached in order to mount equipment or materials atop the rack assembly.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 5 is a partially disassembled front view of the tie-down device of this invention;

FIG. 6 is an assembled view of the tie-down device illustrated in FIG. 5; and

DETAILED DESCRIPTION OF THE PREFERRED EMBODIMENT

Figure 1:
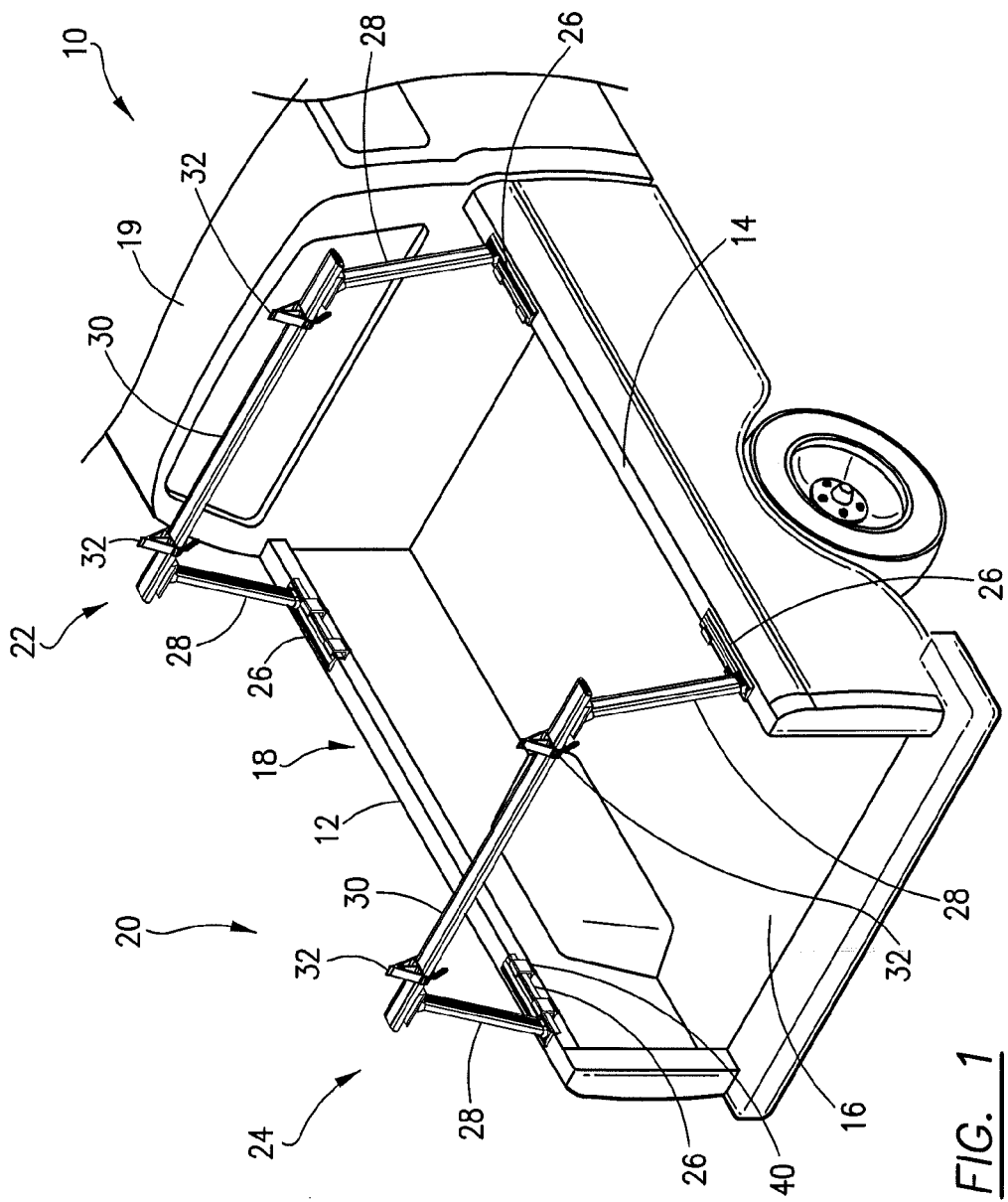
FIG. 1 is a perspective view of the rack system of this invention mounted to the bed of a pickup truck.

Referring now to the Figs., a pickup truck 10 is schematically depicted having a side wall 12, an opposed side wall 14 and a floor 16 between them which collectively define a bed 18 located behind the cab 19. The terms "front" and "forward" when used herein refer to a location proximate the cab 19 of the truck 10, whereas the terms "rear" and "rearward" denote the opposite end of the bed 18. The rack system 20 of this invention generally comprises a forward rack structure 22 and a rear rack structure 24 which are essentially identical to one another. Each rack structure 22, 24 includes a base support 26 located on the side wall 12 of the truck 10, and a second base support 26 located on the opposite side wall 14 in substantial alignment with the first base support 26. Each base support 26 mounts an upright side rail 28, and a cross bar 30 is connected at opposite ends to each side rail 28 so that it extends between the side walls 12, 14 of the truck 10 in position above the bed 18. One or more tie-downs 32, described below, may be mounted to each of the cross bars 30 for securing equipment, materials and other items to the rack system 20.

Figure 2:
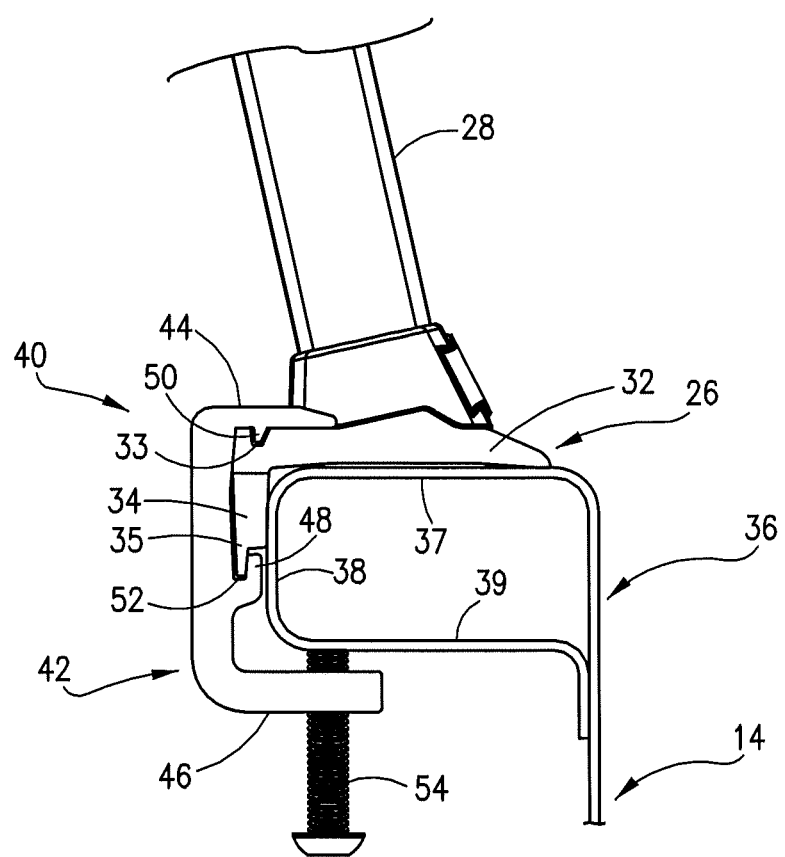
FIG. 2 is a cross sectional view of a clamping device for mounting a base support to a side wall of the pickup truck shown in FIG. 1.
Figure 3:
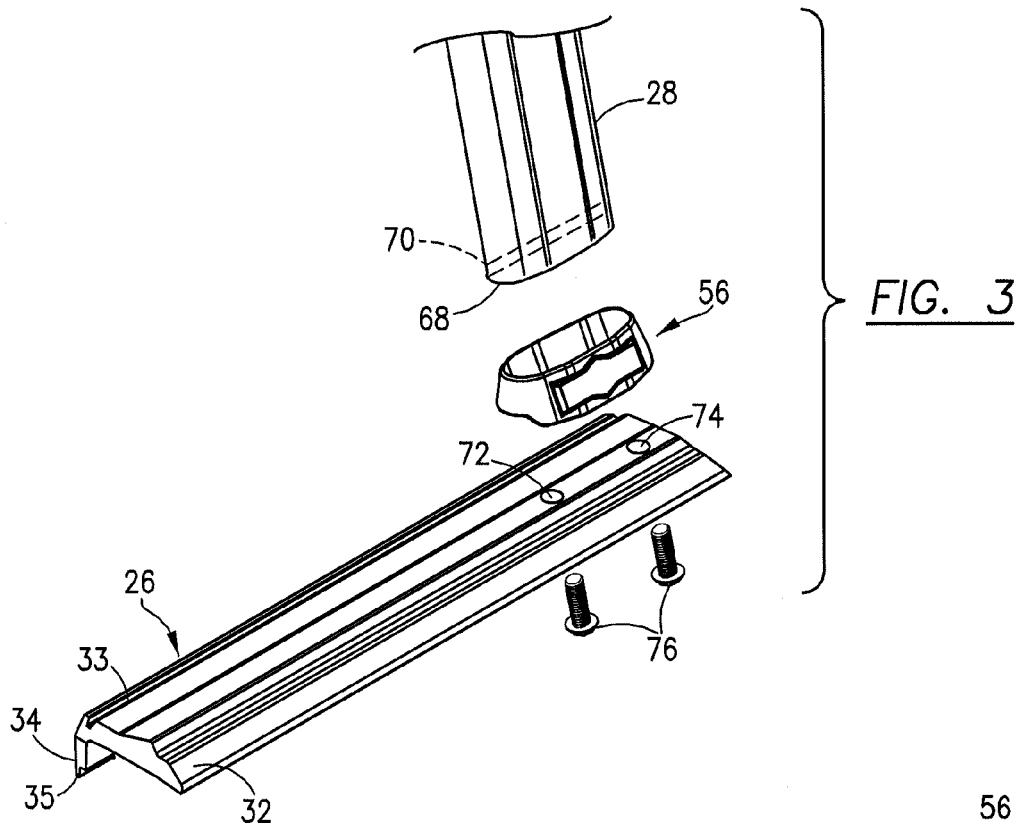
FIG. 3 is an exploded, perspective view of a side rail, adaptor and base support.

As best seen in FIGS. 1, 2 and 3, each base support 26 is formed in and L-shape including a top plate 32 having a recess 33 extending along its length, and a side plate 34 substantially perpendicular to the top plate 32. The side plate 34 is preferably formed with a downwardly extending lip 35. The upper portion of each side wall 12, 14 of the truck 10 has a channel 36 that extends along the length of the bed 18 in the forward to rearward direction. The channel 36 has and upper wall 37, an inner wall 38 and a lower wall 39. The base support 26 is positioned with respect to the truck bed 18 so that its top plate 32 overlies the upper wall 37 of the channel 36 and its side plate 34 abuts the inner wall 38 of channel 36.

At least one, and preferably two, clamping devices 40 are provided to mount each base support 26 to one of the side walls 12 or 14. Each clamping device 40 includes a clamp body 42 comprising an upper leg 44, a lower leg 46 and an intermediate leg 48 located between the upper and lower legs 44, 46. As shown in FIG. 2, the upper leg 44 has a downwardly extending leading edge 50 that fits into the recess 33 formed in the top plate 32 of base support 26. The intermediate leg 48 of clamping device 40 forms a seat 52 that receives the lip 35 of the side plate 34 of base support 26, such that the base support 26 is essentially captured between the upper and intermediate legs 44, 48. The lower leg 46 of the clamping device 40 extends generally parallel to and spaced from the lower wall 39 of the channel 36. A bolt 54 or other fastener is threaded through a bore formed in the lower leg 46 of clamping device 40 and into engagement with the lower wall 39 of channel 36 to secure the base support 26 to the side wall 12 or 14 of the truck bed 18.

Figure 4:
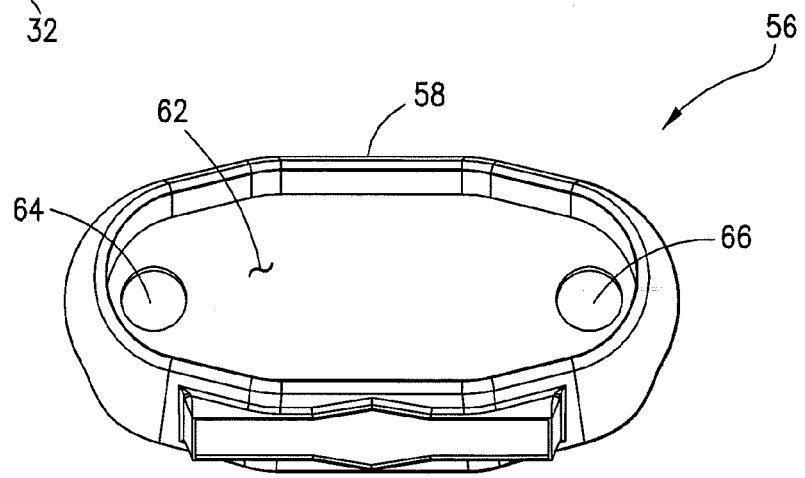
FIG. 4 is a top perspective view of the adaptor depicted in FIG. 3.

Referring now to FIGS. 3 and 4, in order to improve the aesthetics of the rack system 20 of this invention, an adaptor 56 is placed over the joint connection between each side rail 28 and base support 26. Each adaptor 56 has an outer wall 58 defining a hollow interior within which an internal plate 62 is mounted. The internal plate 62 is formed with two through bores 64, 66. One adaptor 56 fits over the lower end of each side rail 28 such that the bottom edge 68 of the side rail engages the internal plate 62 of the adaptor 56. A base plate 70, shown in phantom in FIG. 3, is mounted within the hollow, lower end of each side rail 28 so that internally threaded bores (not shown) in the base plate 70 align with the bores 64, 66 in the internal plate 62 of the adaptor 56. One side rail 28 and one adaptor 56 are placed atop a base support 26 so that holes 72, 74 formed in the base support 26 align with the bores 64, 66 in the internal plate 62 of adaptor 56 and with the internally threaded bores in the base plate 70 of side rail 28. A fastener 76 is extended through each of the holes 72, 74 in base support 26, and through the bores 64, 66 in internal plate 62, into the internally threaded bores in the base plate 70 of side rail 28 to secure both the side rail 28 and adaptor 56 to the base support 26. Preferably, the adaptors 56 are formed of plastic or other resilient material, and are intended for aesthetic purposes rather than as a means of securing the side rails 28 to the base supports 26.

As noted above, one or more tie-down devices 32 may be mounted to each of the cross bars 30 for securing equipment, materials and other items to the rack system 20. Referring to FIGS. 5 and 6, each tie-down device 32 includes a tie-down body 80 and a clamping member 82. The tie-down body 80 comprises a middle plate 84, a foot section 86 and a curved center section 88 located between the middle plate and foot section 84, 86. An extension 89 is preferably connected at the base of the curved center section 88 of tie-down body 80. A pair of outer ribs 90 and 92 are connected to or integrally formed at opposite ends of the middle plate 84, and an inner rib 94 is joined to the middle plate 84 in between the outer ribs 90, 92. The outer ribs 90, 92 extend outwardly from the middle plate 84 at an angle to one another, and connect together at an upper end thereof to form a generally triangular shape. The inner rib 94 connects to the outer ribs 90, 92 at their upper end. One opening 96 is formed between the outer rib 90 and inner rib 94, and a second opening 98 is formed between the outer rib 92 and inner rib 94.

The clamping member 82 includes a head section 100, a foot section 102 and a curved, center section 104 located in between the head and foot sections 100, 102. One end of the middle plate 84 is formed with a channel 106 which receives the head section 100 of the clamping member 82, i.e. the head section 100 may be slid into the channel 106 and retained therein. With the head section 100 in place within channel 106, the foot section 102 of clamping member 82 abuts the foot section 86 of tie-down body 80 so that internally threaded bores (not shown) in each foot section 86, 102 align with one another. A fastener 108 is then tightened down in the threaded bores to urge the clamping member 82 and tie-down body 80 together so that a cross bar 30 is captured between them and the tie-down device 32 is securely mounted thereto. See also FIG. 1.

It can be appreciated that the tie-down devices 32 each provide a number of locations within which rope, cords or other securing means may be attached in order to retain equipment or materials on the cross bars 30 of the rack system 10. Such securing means may be inserted through the openings 96 or 98 in the tie-down body 80 and connected to any one of the ribs 90, 92 or 94, as well as the middle plate 84. Additionally, the extension 89, which is located below the cross bars 30 when the tie-downs 32 are mounted in place, is capable of connecting rope, cord or other securing means.

Figure 7:
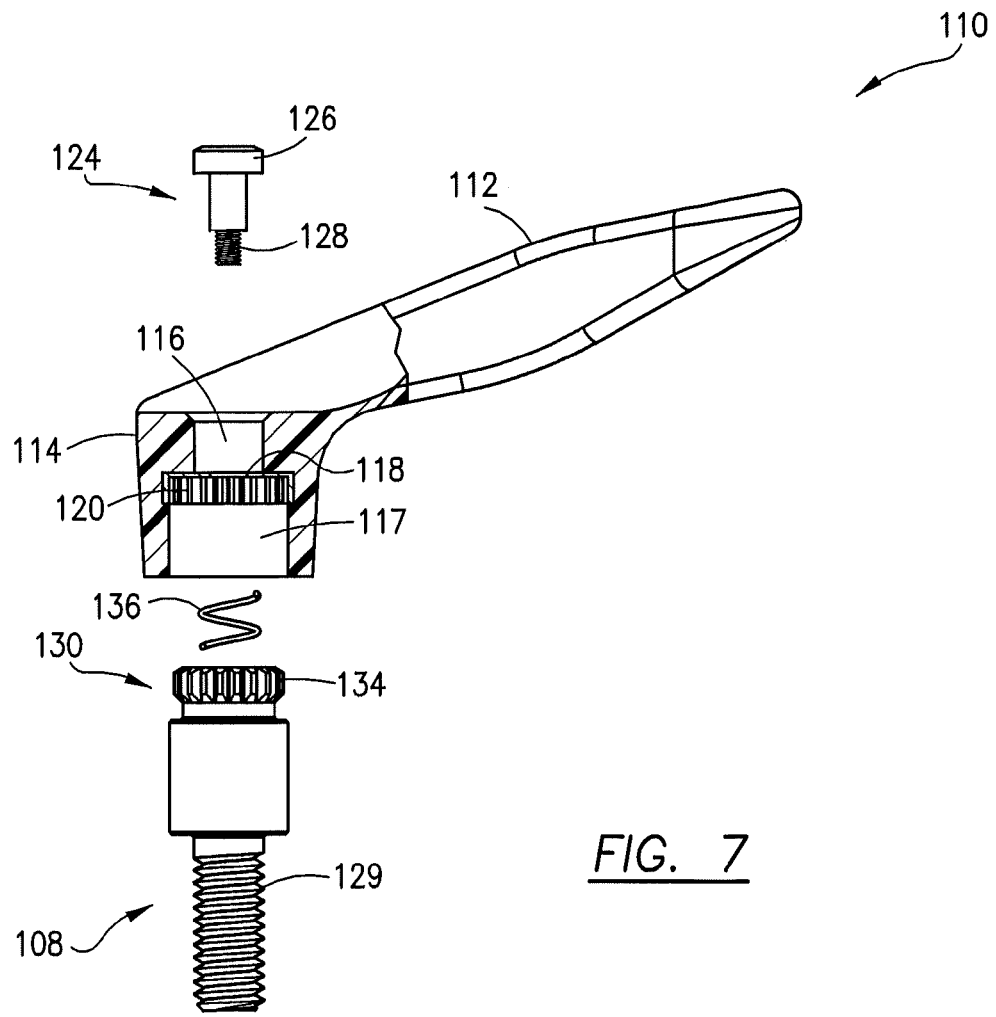
FIG. 7 is an exploded, perspective view of the self-ratcheting handle employed to attach a tie-down device to a cross bar of the rack system.

With reference to FIG. 7, a ratchet device 110 is illustrated which is employed to connect and disconnect the fastener 108 to the tie-down 32. The ratchet device 110 comprises a handle 112 connected to a socket potion 114 portion formed with a stepped cavity having an upper cavity portion 116 and a larger diameter lower cavity portion 117. An annular plate 118 is mounted at the juncture of the upper and lower cavity portions 116, 117 immediately above an internal coupling element, which, in the illustrated embodiment, may take the faun of internal teeth 120 arranged in a ring. A bore is formed in annular plate 118 which receives a spacer 124 having a head 126 and a threaded shaft 128, e.g. the head 126 of the spacer 124 rests atop the annular plate 118 and its threaded shaft 128 extends through its bore into the lower cavity portion 117. The fastener 108 has threaded shank 129, and, a head section 130 formed with an internally threaded, blind bore (not shown) and external teeth 134 which mate with the internal teeth 120 in the stepped cavity of the socket portion 114. The threaded shaft 128 of spacer 124 extends into the blind bore 132 of the fastener 108 to connect the spacer 124 and fastener 108 together. Preferably, a spring 136 extends around the spacer 124 in between the annular plate 118 and the head section 130 of the fastener 108.

The ratchet device 110 is movable between an extended position and a retracted position. In the extended position, the head 126 of the spacer 124 rests on the annular plate 118 such that the external teeth 134 on the fastener 108 are spaced from the internal teeth 120 in the stepped cavity of the socket portion 114. The spring 136 biases the fastener 108 to this extended position, acting between the annular plate 118 and the head section 130 of the fastener 108. When in the extended position, the handle 112 and socket 114 of the ratchet device 110 freely rotate with respect to the fastener 108. In order to secure the fastener 108 to the foot sections 86 and 102 of the tie-down body 80 and clamping member 82, respectively, the socket 114 is urged toward the fastener 108, overcoming the force exerted by spring 136, to the retracted position in which the internal teeth 120 within the socket 114 engage the external teeth 134 on the head section 130 of the fastener 108. With the internal and external teeth 120, 134 engaged, the fastener 108 may be tightened down within the aligning threaded bores in the foot sections 86 and 102. If the socket 114 is released, the spring 136 returns the ratchet device 110 to the extended position wherein the internal and external teeth 120, 134 are disengaged.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A rack system for a vehicle having opposed first and second side walls and a floor which collectively form a bed, said rack system comprising:

a number of base supports, each of said base supports having a first plate adapted to rest atop one of the first and second side walls of the vehicle and a second plate connected substantially perpendicularly to said first plate, said first plate being formed with a recess, said second plate being formed with a downwardly depending lip;

a side rail connected to said first plate of each of said base supports;

a number of cross bars, each of said cross bars being mounted at opposite ends to one of said side rails connected to a base support;

a number of clamping devices, each of said clamping devices including a top leg, a bottom leg spaced from said top leg and an intermediate leg located between said top and bottom legs, said top leg being formed with a leading edge, said intermediate leg being formed with a seat, said bottom leg including a locking member which is movable between a locked position and an unlocked position, at least one of said clamping devices being positioned with respect to one of said base supports so that said top leg contacts said first plate of said one base support with said leading edge of said top leg extending into said recess in said first plate, and so that said downwardly depending lip of said second plate is received within said seat formed by said intermediate leg whereby said at least one base support is captured between said top leg and said intermediate leg, said at least one locking member being effective when in said locked position to urge said top leg of said clamping device against said first plate of said base support and in a direction toward said bottom leg.

2. A rack system for a vehicle having opposed first and second side walls and a floor which collectively form a bed, said rack system comprising:

a number of base supports, each of said base supports having a first plate adapted to rest atop one of the first and second side walls of the vehicle and a second plate connected to said first plate, said first plate of each of said base supports being formed with at least one bore;

a number of side rails each having an upper end and a lower end, said lower end mounting a base plate formed with at least one internally threaded bore;

a number of adaptors each formed with an outer wall having a non-load bearing upright portion defining a hollow interior, an internal plate being mounted within said hollow interior which is formed with at least one bore, said lower end of one of said side rails being received within said hollow interior of one of said adaptors so that said at least one internally threaded bore in said base plate of said one side rail aligns with said at least one bore in said internal plate of said one adaptor and so that said non-load bearing upright portion of said one adaptor covers at least a portion of said lower end of said one side rail, said one adaptor and said one side rail being positioned on one of said base supports so that said at least one bore in said internal plate of said one adaptor and said at least one internally threaded bore in said base plate of said one side rail both align with said at least one bore in said first plate of said one base support, a fastener being extended through said at least one bore in said first plate and through said at least one bore in said internal plate into engagement with said at least one internally threaded bore in said base plate of said one side rail to releasably mount said one side rail and said one adaptor to said one base plate;

a number of cross bars, each of said cross bars being mounted to said upper end of one of said side rails connected to a base support;

a number of clamping devices, said clamping devices being effective to mount said base supports to one of the first and second side walls of the vehicle.

3. A rack system for a vehicle having opposed first and second side walls and a floor which collectively form a bed, said rack system comprising:

a number of base supports each adapted to mount to one of the first and second side walls of the vehicle;

a side rail connected to each of said base supports;

a number of cross bars, each of said cross bars being mounted to one of said side rails connected to a base support located on the first side wall of the vehicle and to one of said side rails connected to a base support located on the second side wall of the vehicle;

at least one tie-down device including a tie-down body and a clamping member which may be engaged and disengaged from said tie-down body, said tie-down body having a middle plate, a first foot section and a first center section located between said middle plate and said first foot section, said clamping member being formed with a head section, a second foot section and a second center section located between said head section and said second foot section, said first center section of said tie-down body and said second center section of said clamping member each being positioned in engagement with one of said cross bars so that said first and second foot sections thereof substantially abut one another, a fastener being connected between first foot section of said tie-down body and said second foot section of said clamping member and being tightened down to releasably clamp said cross bar between said tie-down body and said clamping member of said at least one tie-down device; and a ratchet device having a handle and socket, said socket being formed with a cavity including internal coupling elements, a spacer mounted within said cavity of said socket and being movable therein in response to movement of said ratchet device between an extended position and a retracted position, said spacer being connected to said fastener having a head formed with external coupling elements, said external coupling elements of said fastener being engageable with said internal coupling elements of said socket with said ratchet device in said retracted position so that said fastener may be rotated by rotation of said handle and socket, said external coupling elements of said fastener disengaging said internal coupling elements of said socket with said ratchet device in said extended position.

4. The rack system of claim 3 in which said tie-down body further includes a first outer rib, a second outer rib spaced from said first outer rib and an inner rib located between said first and second outer ribs, each of said first and second outer ribs and said inner rib being connected together at one end and mounted to said middle plate at the other end.

5. The rack system of claim 4 in which said first center section on said tie-down body further includes an extension.

6. The rack system of claim 3 in which said middle plate of said tie-down body is formed with a channel.

7. The rack system of claim 6 in which said head section of said clamping member is insertable within said channel in said middle plate of said tie-down body.

8. The rack system of claim 3 further including a spring coupled to said spacer, said spring being effective to bias said ratchet device toward said extended position.

9. The rack system of claim 8 in which said spring is located between a plate mounted within said cavity in said socket and said head of said fastener.

* * * * *